United States Patent
Gawade et al.

(10) Patent No.: US 10,059,270 B1
(45) Date of Patent: Aug. 28, 2018

(54) SINGLE-HAND OPERABLE FLEXIBLE POUCH ASSEMBLY

(71) Applicant: GM GLOBAL TECHNOLOGY OPERATIONS LLC, Detroit, MI (US)

(72) Inventors: Tushar Rajaram Gawade, Maharashtra (IN); Marten Wittorf, Ingelheim (DE); Peter Kahler, Nierstein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/445,600

(22) Filed: Feb. 28, 2017

(51) Int. Cl.
*B60R 7/00* (2006.01)
*B60R 11/00* (2006.01)
*B60R 7/04* (2006.01)

(52) U.S. Cl.
CPC .............. *B60R 7/043* (2013.01); *B60R 7/046* (2013.01); *B60R 2011/0007* (2013.01); *B60R 2011/0028* (2013.01); *B60R 2011/0036* (2013.01)

(58) Field of Classification Search
CPC .. B60R 7/00; B60R 7/11; B65D 33/24; B65D 33/16
USPC ......................................... 224/400
See application file for complete search history.

(56) References Cited

U.S. PATENT DOCUMENTS

| | | | | |
|---|---|---|---|---|
| 1,310,869 A * | 7/1919 | McHugh | ................ | B65D 33/30 383/43 |
| 2,582,447 A * | 1/1952 | Meyers | .................... | A45C 3/06 150/113 |
| 5,037,138 A * | 8/1991 | McClintock | ........... | B65D 33/24 383/210 |
| 5,383,727 A * | 1/1995 | Rife | ........................ | A45C 11/00 150/900 |
| 6,305,590 B1 * | 10/2001 | Hayes | ...................... | B62J 9/008 190/110 |
| 6,328,191 B1 * | 12/2001 | Conley | ...................... | B60R 7/04 150/130 |
| 2005/0279793 A1 * | 12/2005 | Mulvihill | .................. | B60R 7/02 224/542 |
| 2006/0011686 A1 * | 1/2006 | Latham | ..................... | B60R 7/04 224/579 |
| 2007/0290109 A1 * | 12/2007 | Ahlburg | ................. | B60N 3/105 248/311.2 |
| 2015/0253813 A1 * | 9/2015 | Morrow | ................ | G06F 1/1626 248/229.1 |

* cited by examiner

*Primary Examiner* — Brian D Nash (74) *Attorney, Agent, or Firm* — Lorenz & Kopf, LLP (57) ABSTRACT

A single-hand operable flexible pouch assembly includes a substrate, a flexible pouch body attached to the substrate along only part of a perimeter of the flexible pouch body, leaving at least a portion of the perimeter of the flexible pouch body unattached to the substrate, and a belt assembly connected to the perimeter of the flexible pouch body along said portion thereof that is unattached to the substrate. The belt assembly includes a first, inner belt including a first slot. The belt assembly further includes a second, outer belt including a second slot. Still further, the belt assembly includes a spring-loaded pin mechanism including a pin and a spring, wherein the pin is configured in four portions. The flexible pouch is suitably implemented at various locations throughout a vehicle.

20 Claims, 10 Drawing Sheets

SINGLE-HAND OPERABLE FLEXIBLE POUCH ASSEMBLY

INTRODUCTION

The present disclosure generally relates to vehicle storage compartments, which may be embodied as a pouch or pocket. More particularly, the present disclosure relates to a flexible pouch/pocket, positioned in a vehicle, for example along door trim, central console side wall, seat back/side, cargo wall, cargo floor, roof surface, among other places, which is operable using a single hand.

Figure 1:
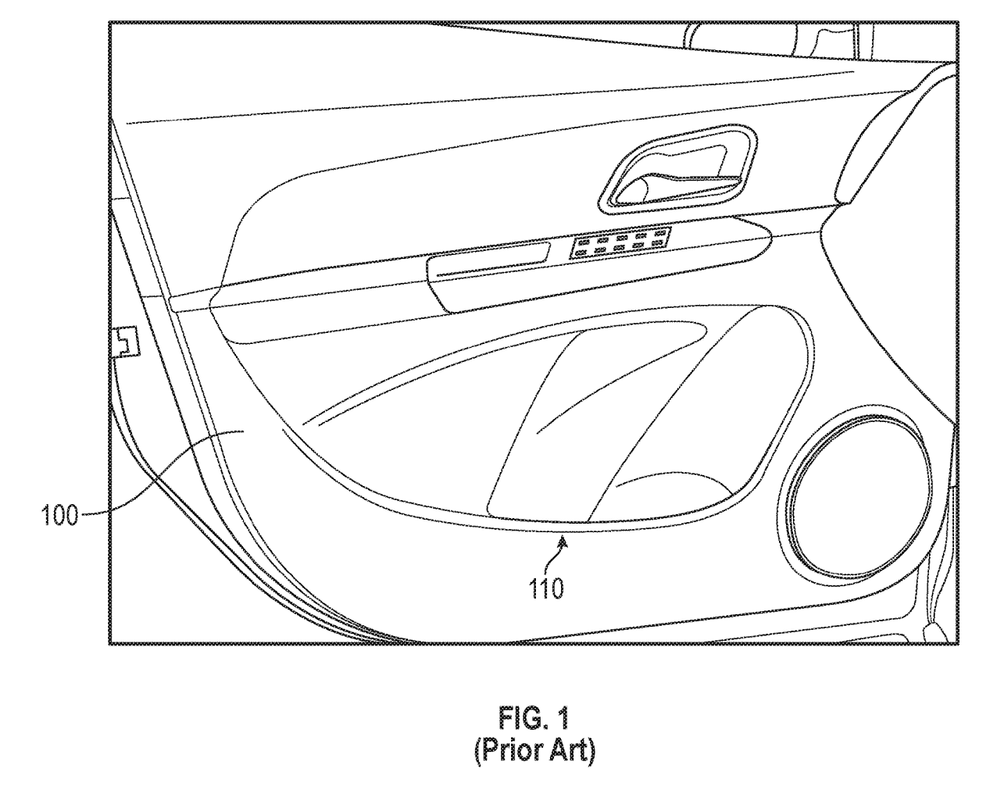
FIG. 1 illustrates a prior art rigid pocket located in the door trim of a vehicle.

Vehicle storage compartments, commonly referred to as "pockets" or "pouches", are known in the art as areas of the interior of a vehicle that are designed to hold objects, such as the vehicle operator's personal effects. Such pouches can generally be located anywhere in the vehicle, and may be of any size or shape. For example, FIG. 1 shows an implementation of a rigid pocket 110 provided on a door trim panel 100 of a vehicle driver's side door. Rigid pockets, such as pocket 110, suffer from several drawbacks, including the fact that they are not adjustable in size or shape, and therefore may not be suitable to safely and securely enclose certain of the operator's personal effects. Accordingly, it is also known to provide a "flexible" pouch, which is typically made of a flexible material that allows the size and shape of the pouch to be expanded/contracted as necessary to accommodate objects of various sizes.

Figure 2:
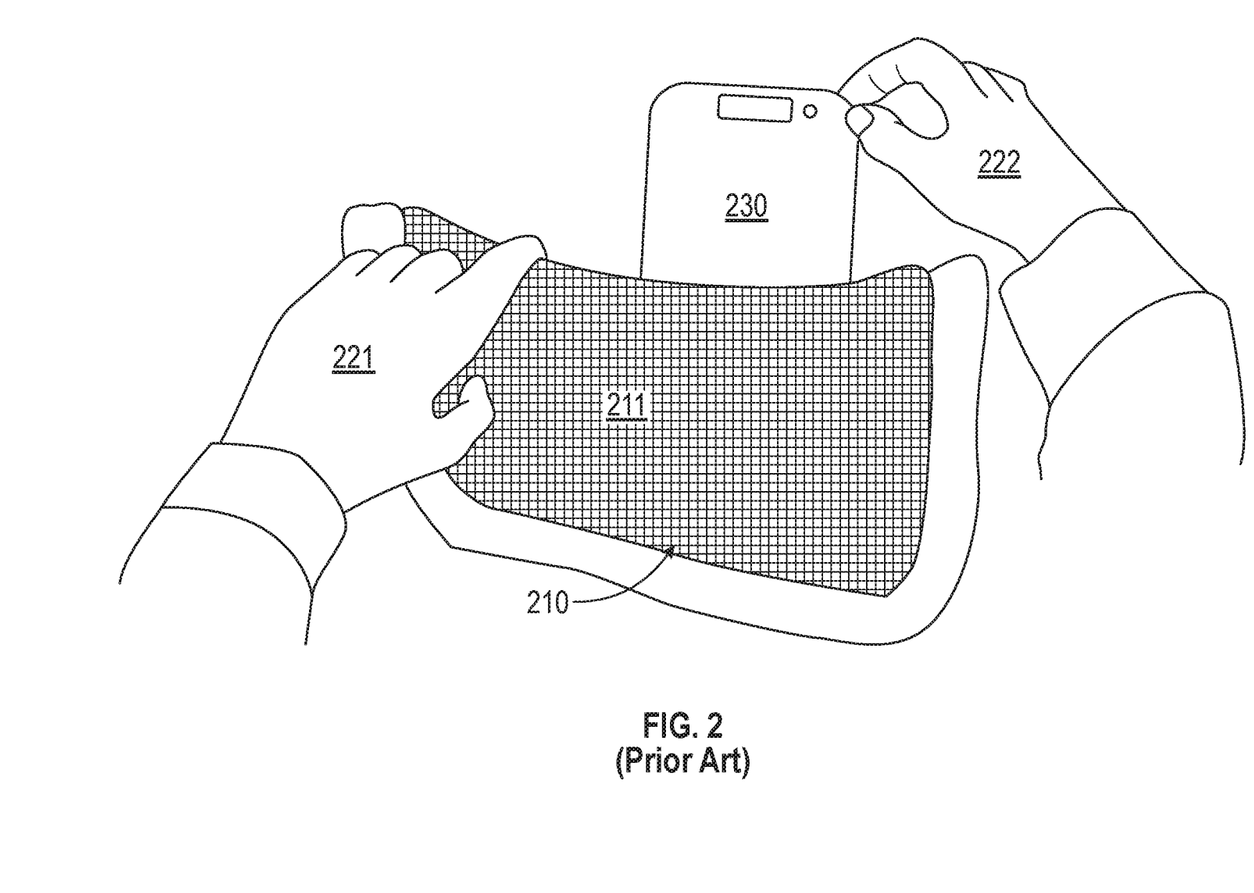
FIG. 2 illustrates a prior art flexible pouch that requires two hands to effectively operate.

Yet, flexible pouches also remain deficient in certain respects. For example, it has been typically required for the operator to use two hands to adequately operate (i.e., place objects in, or remove objects from) these flexible pouches. FIG. 2 illustrates a typical flexible pouch 210, which is made from a flexible material 211. As illustrated, the operator's left hand 221 is pulling on the flexible pouch 210 to increase the size of its opening, while the user's right hand 222 is placing an object 230 into the opening. Without the left hand 221 applying a pulling force to the flexible pouch 210 to provide sufficient opening area, the operator would not be able to place the object 230 into the opening. Thus, it becomes apparent that flexible pouches, such as pouch 210, require both hands (221, 222) to operate effectively.

As will be appreciated in the art, there are many practical instances when both of a vehicle operators hands are not available to operate a flexible pouch, yet it would still be desirable to access the pouch. Such instances may include, for example, the use of one hand for steering, the use of one hand for supporting/attending to a child, or possibly the presence of an operator, whom, perhaps due to a physical limitation, may only have functional use of one hand. No matter the circumstance, having only one hand available to operate the flexible pouch 210 shown in FIG. 2 substantially precludes its effective use in many situations.

Accordingly, it is desirable to provide improved vehicle storage compartments, such as pockets or pouches, which enjoy the dual benefits of both flexibility and single-handed operation. In addition, it is desirable to provide such pockets or pouches that are economical to manufacture using conventional tooling. Furthermore, other desirable features and characteristics of the present disclosure will become apparent from the subsequent detailed description and the appended claims, taken in conjunction with the accompanying drawings and this introductory section.

BRIEF SUMMARY

A single-hand operable flexible pouch assembly includes a substrate, a flexible pouch body attached to the substrate along only part of a perimeter of the flexible pouch body, leaving at least a portion of the perimeter of the flexible pouch body unattached to the substrate, and a belt assembly connected to the perimeter of the flexible pouch body along said portion thereof that is unattached to the substrate. The belt assembly includes a first, inner belt including a first slot, the first slot including a plurality of first pin-hole portions having a first diameter and a plurality of first straight portions between the first pin-hole portions having a first width, wherein the first diameter has a greater magnitude than the first width. The belt assembly further includes a second, outer belt including a second slot, the second slot including a plurality of second pin-hole portions having a second diameter and a plurality of second straight portions between the second pin-hole portions having a second width, wherein the second width is of substantially the same magnitude as the first diameter and wherein the second diameter has a greater magnitude than the second width. Still further, the belt assembly includes a spring-loaded pin mechanism including a pin and a spring, wherein the pin is configured in four portions, including: (1) a first, innermost portion having a diameter that is of substantially the same magnitude as the first width, (2) a second portion, immediately outward from the innermost portion, having a diameter that is of substantially the same magnitude as both the first diameter and the second width, (3) a third portion, immediate outward from the second portion, having a diameter that is of substantially the same magnitude as the second diameter, and (4) a fourth, outermost portion having a diameter greater than the second diameter, and wherein the spring is disposed over the first, innermost portion of the pin.

In further embodiments, the single-hand operable flexible pouch assemblies described above may be incorporated into a vehicle, for example along door trim, central console side wall, seat back/side, cargo wall, cargo floor, and/or roof surface.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed flexible pouches. Furthermore, there is no intention to be bound by any theory presented in the preceding introductory section or the following detailed description. As used herein, the term substantially the same, such as "substantially the same magnitude," means that two values differ from each other on an absolute basis by less than 20%, by less than 10%, or by less than 5%, in alternate embodiments.

The present disclosure generally provides a single-hand operated flexible storage compartment, for use at various possible locations throughout a vehicle, which stays in an open position during object loading/unloading. As initially noted above, existing flexible storage compartments require the use of two hands for opening the compartment, moving objects in/out of the compartment, and closing the compartment. Many other compartments remain rigid, and the closing option is not available. Thus, in this disclosure is provided a single-hand operated flexible pouch for interior storage. The flexible pouch expands (i.e., opens) and contracts (i.e., closes) due to flexibility built into the pouch body and associated belt assembly. The pouch stays in the open position due to a spring-loaded pin mechanism and slot design included as part of the belt assembly. Thus, it becomes possible to move objects to/from the flexible pouch using just a single hand.

Figure 3:
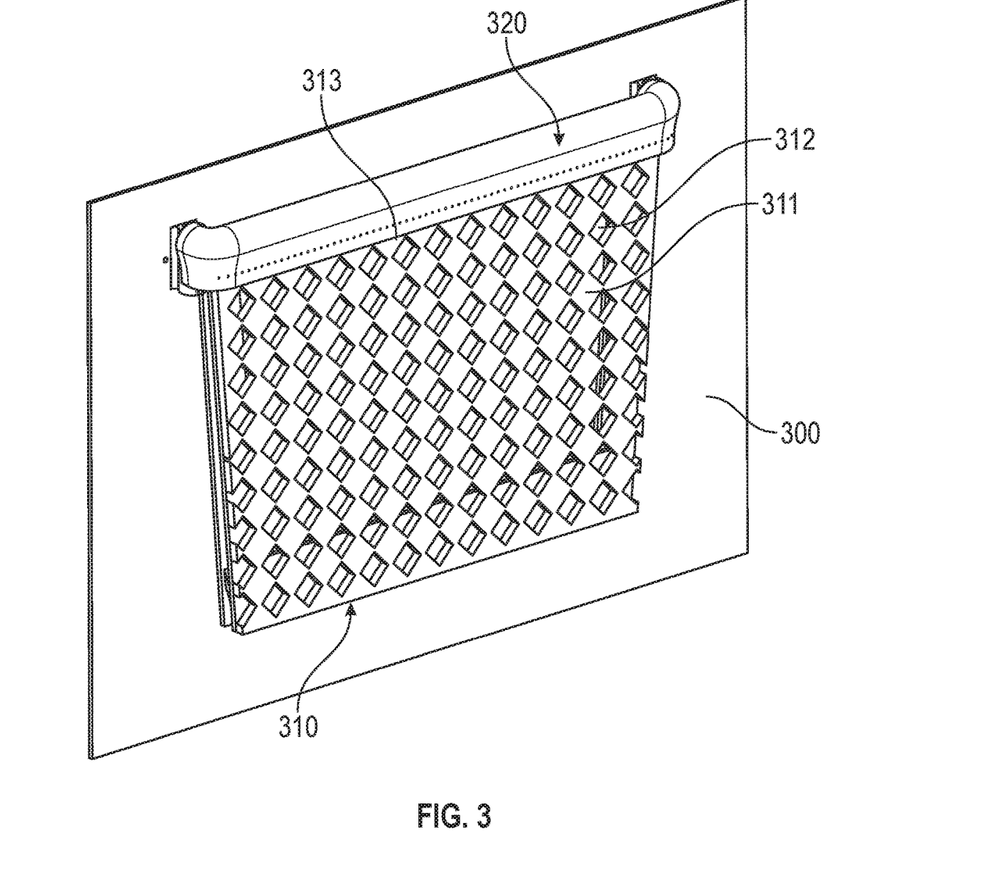
FIG. 3 illustrates a single-hand operable flexible pouch in accordance with an embodiment of the present disclosure.

With reference now to FIG. 3, the major components of an exemplary flexible pouch assembly are illustrated. The back side of the flexible pouch assembly, which is referred to herein generally as substrate 300, is embodied variously depending on the location of the flexible pouch assembly. In the example of a door pouch, the substrate 300 may be embodied as a door trim panel. In the example of a centrally-located pouch, the substrate 300 may be embodied as a central console side wall. In the example of a seat pouch, the substrate 300 may be embodied as a seat-back. Further, in the example of a cargo/trunk pouch, the substrate 300 may be embodied as a cargo wall or floor. Still further, in the example of a pocket at or near the roof of a vehicle, the substrate 300 may be embodied as a roof surface. Other possible locations for a flexible pouch assembly, including their associated substrates, will be readily envisioned by the person having ordinary skill in the art.

FIG. 3 also illustrates the pouch body 310, which is made of a flexible material 311. Although a generally rectangular pouch body 310 shape is shown in FIG. 3, it should be appreciated that the pouch body 310 may be of any shape or size. Moreover, although the pouch body 310 in FIG. 3 includes patterned openings 312 (diamond-shaped as shown), other possibly pouch bodies have no patterned openings. The flexible material 311 may comprise any fabric, plastic, or other material that has flexible properties. As used herein, the term "flexible" refers to the property of expansion in one or more dimensions upon the application of a pulling force. For example, in its base state, the flexible pouch 310, particularly the upper end 313 thereof, substantially abuts against the substrate 300. Upon an operator applying a pulling force to belt assembly 320 (the belt assembly is discussed in greater detail below in connection with FIG. 4), the length-wise dimension of the upper end 313 (being attached to the belt assembly 320) increases as the upper end 313 is pulled away from the substrate 300, revealing an opening between the belt assembly 320/upper end 313 and the substrate 300 through which an object may pass, for storage in the flexible pouch assembly between the pouch body 310 and the substrate 300.

Figure 4:
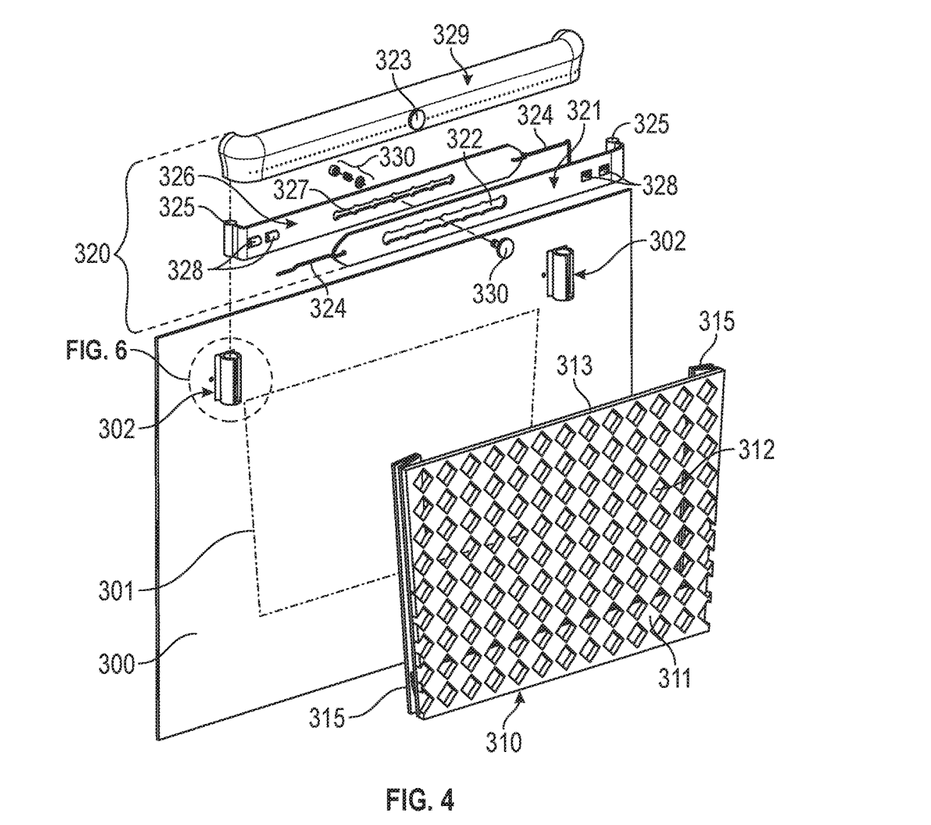
FIG. 4 is a disassembled view of the flexible pouch shown in FIG. 3, illustrating the individual components thereof.

Referring now to FIG. 4, a disassembled view of an embodiment of the flexible pouch assembly is provided. As shown more clearly, the pouch body 310 includes a flange portion 315 that is provided on the substrate-facing perimeter of the pouch body 310 on three sides, namely the left, right, and lower sides (those excluding the upper end 313). The flange portion 315 may be used to connect/attach the pouch body 310 to the substrate 300. For example, the substrate 300 includes a stitching outline 301, where stitching may be performed between the flange portion 315 and the substrate 300 for purposes of connecting these two components. Various other attachment means, such as adhesives or welding, would also be possible. Note that the upper end 313 is not stitched (attached), so that it may be pulled back from the substrate 300 to form the opening for objects to be placed in/removed from the flexible pouch assembly. Moreover, in some embodiments, the flange portion 315 can include expandable folds, such that when the pouch body 310 is pulled, the expandable folds straighten to allow for a greater volume of storage within the flexible pouch assembly.

The components of the belt assembly 320 are also shown in greater detail in FIG. 4. As shown, the belt assembly includes a first (outer) belt 321 and a second (inner) belt 326. The outer belt 321 overlaps the inner belt 326 with respect to the substrate 300. The attachment end 325 of each belt 321, 326 may be embodied as a cylindrical (or other shape) flange that is insertable into a respective hinge portion 302 positioned on the substrate 300. Inserting the flange of attachment end 325 into the hinge 302 allows each belt attachment end 325 to remain in a fixed position with respect to the substrate 300. Belt 321 includes slot 322, and belt 326 includes slot 327. Each slot 322, 327 extends for a distance lengthwise along each respective belt 321, 322 (such distance being less than the overall length of the belts 321, 326, such as from about 20% to 80% of the overall length, or from about 35% to about 65% of the overall length). Each slot 322, 327 is configured to receive the spring-loaded pin mechanism 330. At an end of each belt 321, 326 opposite the attachment end 325, provided is an elastic band 324. Each elastic band 324 allows its respective belt 321, 326 to be moveable relative to the other belt 326, 321. The elastic bands 324 of each belt 321, 326 are guided by band guides 328 positioned on each belt 321, 326. Moreover, for aesthetic purposes, the belt assembly 320 may include a belt cover 329, which conceals the belts 321, 326 from view, and provides a convenient grip for the operator upon pulling on the belt assembly 320. The belt cover 329 includes a hole 323, through which the spring-loaded pin mechanism 330 may pass, to allow the operator to access the spring-loaded pin mechanism 330. The belt cover 329 may be made of any flexible material, such as fabrics or plastics.

Figure 5:
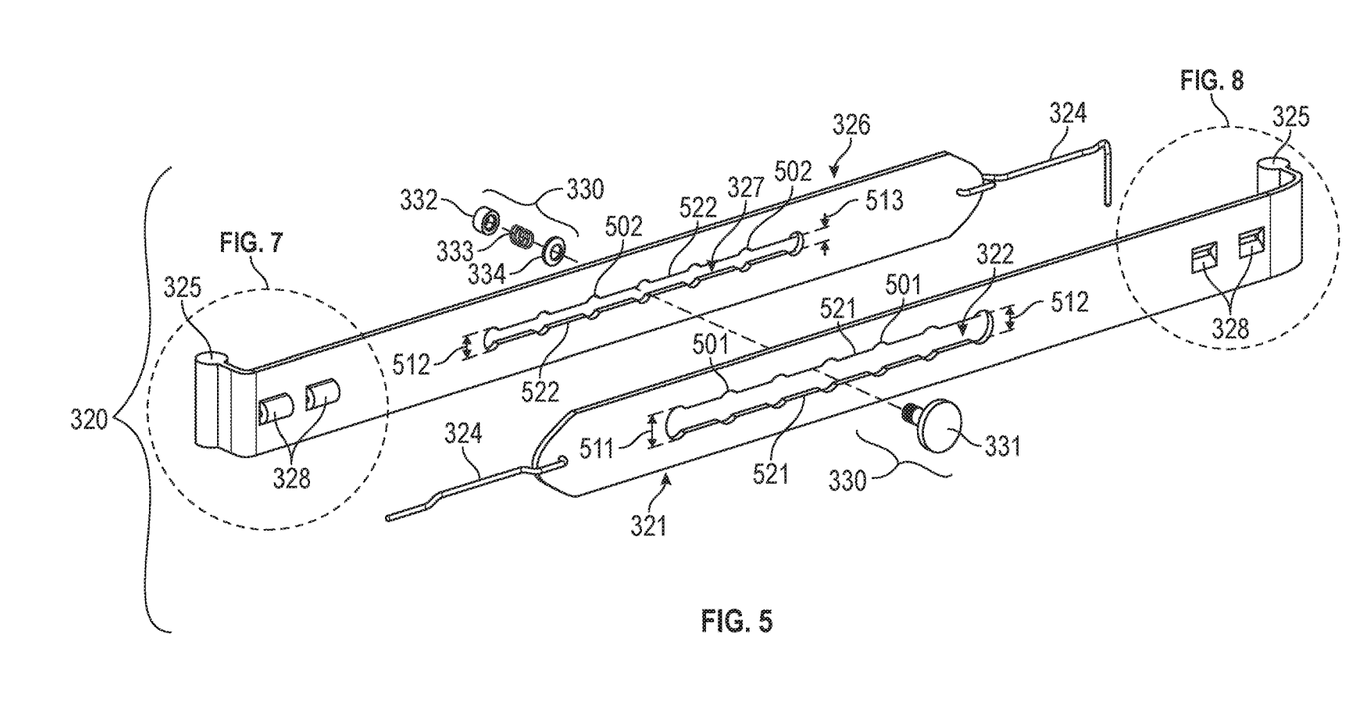
FIG. 5 is an enlarged view of the belt assembly of the flexible pouch shown in FIG. 3.

Greater detail regarding the belt assembly 320 and the spring-loaded pin assembly 330 is provided in FIG. 5. As shown, each slot 322, 327 is provided with a plurality of pin-hole portions 501, 502, respectively. The pin-hole portions 501, 502 of each slot 322, 327 are separated from one another by straight portions 521, 522. With regard to slot 322, its pin-hole portions 501 have a diameter 511, and its straight portions 521 have a width 512. With regard to slot 327, its pin-hole portions 502 have a diameter 512 (i.e., same as width 512 of slot 322), and its straight portions 522 have a width 513. It should be noted that diameter 511 is greater than width/diameter 512, and width/diameter 512 is greater than width 513. In this regard, slot 322 generally has greater dimensions, with respect to both its pin-hole portions 501 and its straight portions 521, as compared to portions 502, 522 of slot 327. While the pin-hole portions are generally shown as round, they could be other shapes, for example, square, in which case their "diameter" would instead be a width. Note a corresponding change to the cross-section of the pin 331, described below, would also be required.

The spring-loaded pin mechanism 330, as shown in FIG. 5, generally includes four components: pin 331, nut cap 332, spring 333, and washer 334. The pin 331 is inserted into the belts 321, 326 (namely into the slots 322, 327 thereof) from outside of the outer belt 321. The washer 334 receives the pin 331 inside of the inner belt 326, and abuts against the inner belt 326, followed in sequence by the spring 333 and the nut cap 332, as illustrated. The washer 334, spring 333, and nut cap 332 components remain coupled with the pin 331, but allow the pin 331 to be positioned at various depths (outward to inward) within the slots 322, 327, as described in greater detail below with regard to FIG. 9.

Figure 6:
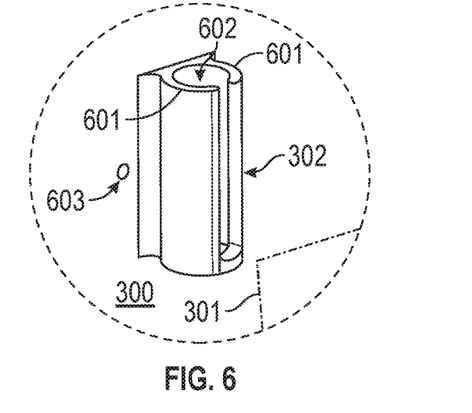
FIG. 6 is an enlarged view of a hinge component for holding the flexible pouch of FIG. 3 in place on a substrate in the vehicle, such as a trim panel.

Turning next to FIG. 6, greater detail regarding the hinge portion 302 is illustrated. Generally, the hinge portion 302 includes a shroud 601 and an interior area 602 defined by the shroud 601. The attachment end 325 of each belt 321, 326 inserts into the interior area 602, and is held in place by the shroud 601. Also note that FIG. 6 illustrates hole 603, located adjacent to the hinge portion 302, for receiving and securing an elastic band 324 into the substrate 300.

Figure 7:
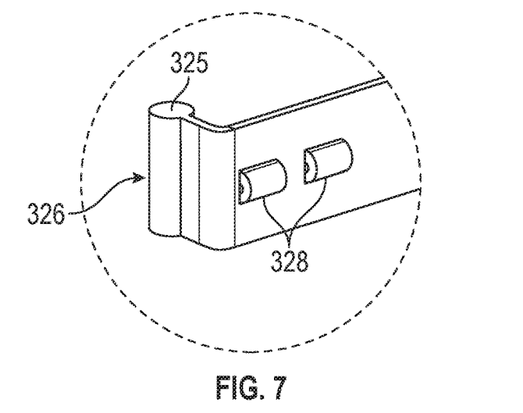
FIGS. 7 and 8 are enlarged views of belt assembly ends of the belt assembly shown in FIG. 5, which are insertable into the hinge component of FIG. 6.
Figure 8:
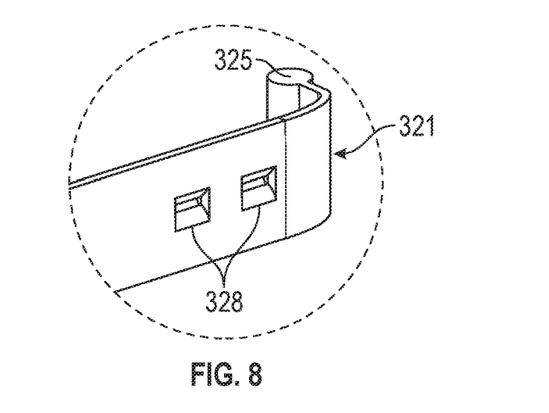

FIG. 7 provides greater detail regarding attachment end 325 of belt 326, and FIG. 8 provides greater detail regarding attachment end 325 of belt 321. In the embodiment illustrated, each attachment end 325 is provided with a generally cylindrical flange, though other shapes are possible. The attachment ends 325 are generally configured in a shape and size that allows them to be inserted into, and retained within, the shroud 601 of hinge portion 302. Further illustrated in greater detail in FIGS. 7 and 8 are the band guides 328. Each band guide 328 generally is provided as a detent that includes holes on its lateral ends. The elastic band 324 passes through the lateral end holes and is guided along the respective belt 321, 326 by the detent (as shown, the elastic band 324 of the first belt 321 passes through the band guide 328 of the second belt 326, and vice versa). The elastic bands 324 and band guides provide a force and guiding means, respectively, such that the flexible pouch, without force applied thereto, returns to the position and configuration substantially as shown in FIG. 3 (i.e., closed). The elastic bands 324 also generally urge the belts 321, 326 face-to-face against one another.

Figure 9:
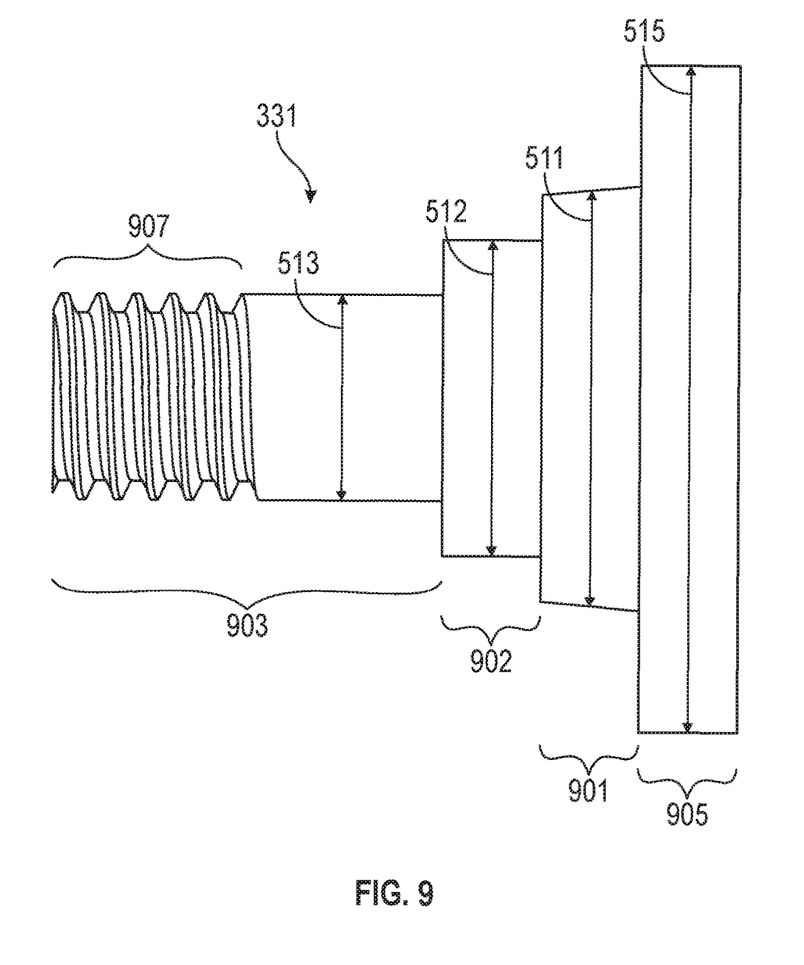
FIG. 9 is an expanded view of the pin used in the belt assembly shown in FIG. 5.

With reference now to FIG. 9, greater detail regarding the pin 331 of the spring-loaded pin assembly 330 is illustrated. Generally, pin 331 may be divided into four portions based on diameter. The innermost (with respect to the flexible pouch assembly) portion 903 has the diameter 513, as previously described with regard to the inner belt 326 slot 327 straight portions 522. It should be noted that the innermost portion 903 is threaded at its innermost end 507 for receiving the nut cap 332. The innermost portion 903 also is where the washer 332 and the spring 333 are positioned. The second portion 902 (outward from the innermost portion 903) has the diameter 512, as previously described with regard to the inner belt 326 slot 327 pin-hole portion 502 and the outer belt 321 slot 322 straight portions 521. The third portion 901 (outward from the second portion 902) has the diameter 511, as previously described with regard to the outer belt 321 slot 322 pin-hole portions 501. Further, the outermost portion 905 has a diameter 515, which is greater than any width or diameter dimension of the outer belt 321 slot 322, and is provided to ensure that the pin 331 is not able to pass entirely through the slot 322. Thus, the outermost portion 905 remains outward from the outer belt 321 at all times. The outermost portion 905 also remains outside of the belt cover 329 (the pin 331 is disposed through hole 323), such that outermost portion 905 of pin 331 is the portion of the pin 331 that is grasped by the operator's hand when operating the spring-loaded pin mechanism 330, as will be described in greater detail below with regard to FIGS. 10 and 11. The thickness of the second portion 902 (along the length of the pin 331) is about equal to the thickness of the inner belt 326, and the thickness of the third portion 901 is about equal to the thickness of the outer belt 321.

Figure 10:
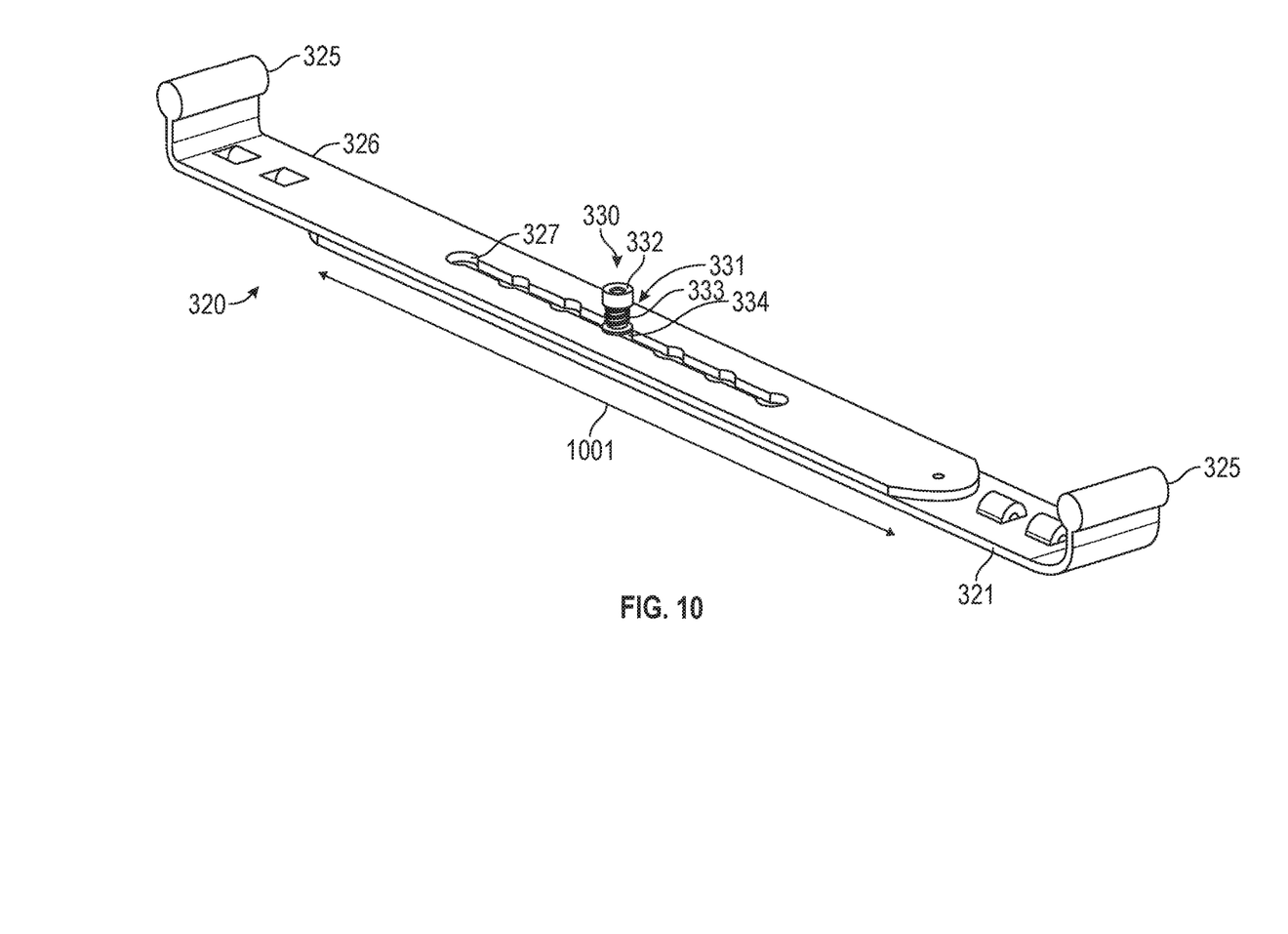
FIG. 10 illustrates the expansion and contraction of the belt assembly, during single-handed operation.
Figure 11:
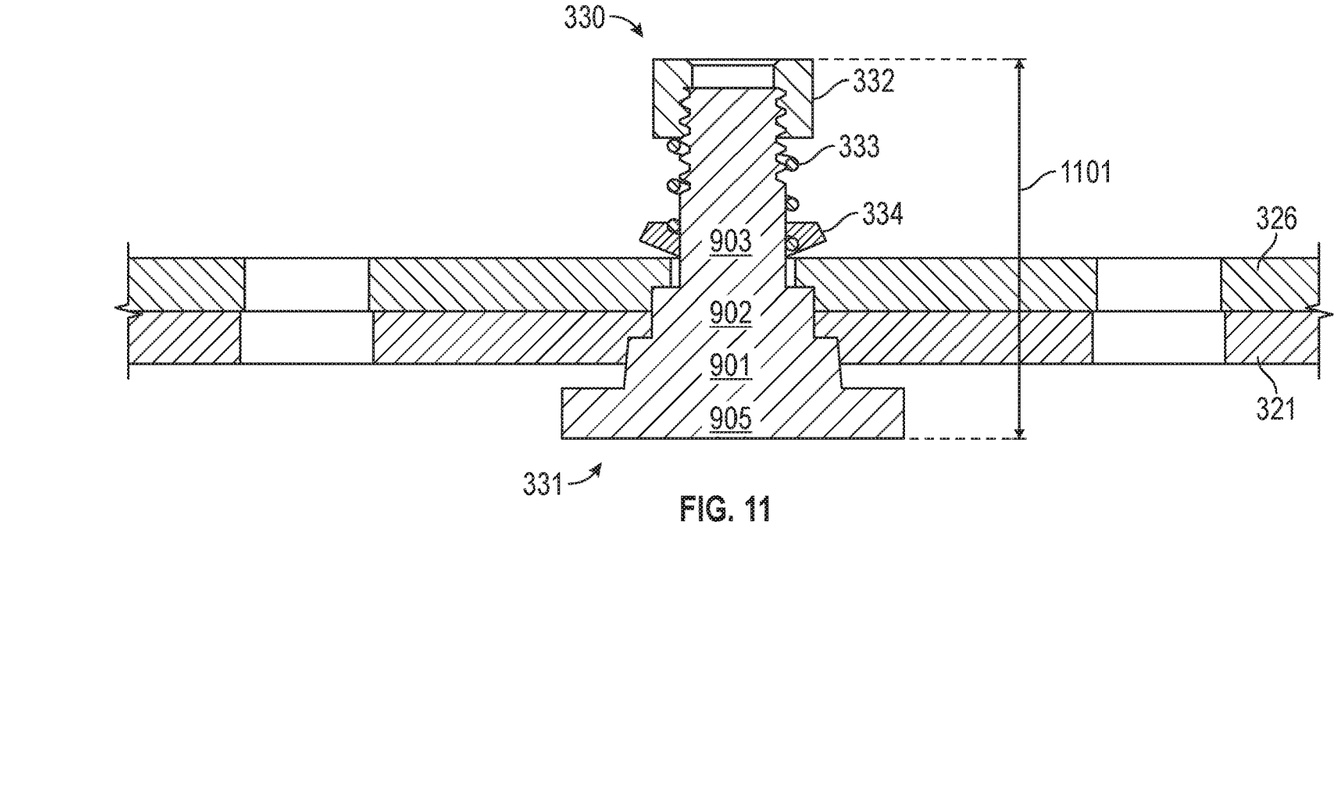
FIG. 11 illustrates the movement of the pin mechanism of the belt assembly during single-handed operation of the belt assembly.

FIGS. 10 and 11 illustrate the operation of the belt assembly 320 and the spring-loaded pin mechanism 330, respectively. In a locked state, the spring-loaded pin mechanism 330 holds the pin 331 as far inward as possible, within the pin hole portions 501, 502 of the slots 322, 327, respectively. That is, due to the match in diameter size 512, the second portion 902 fits within one of the pin hole portions 502 of the inner belt 326 slot 327, and further due to the match in diameter size 511, the third portion 901 fits within one of the pin hole portions 501 of the outer belt 321 slot 322. In this locked position, the innermost portion 903 remains fully inward from the inner belt 326. Because diameter 512 is greater than width 513 of the inner belt 326 slot 327 straight portions 522, and because diameter 511 is greater than width 512 of the outer belt 321 slot 322 straight portions 521, the pin 331, in the locked position, prevents relative movement between the belts 321, 326 (that is, movement is prevented with respect to movement arrow 1001 in FIG. 10).

To change the spring-loaded pin mechanism 330 to the unlocked state, the operator may grasp the outermost portion 905 of the pin 331 using only one hand, and apply thereto a force that causes the pin 331 to move outwardly (i.e., along movement arrow 1101 in FIG. 11). The outward movement of the pin 331 causes innermost portion 903 to move into the slot 327, and causes second portion 902 to move into the slot 322. As noted above, innermost portion 903 has diameter 513, which is the same as the width of inner belt 326 slot 327 straight portions 522, and the second portion 902 has diameter 512, which is the same as the outer belt 321 slot 322 straight portions 521. Thus, in this configuration, the respective pin 331 portions 903, 902 are free to move throughout an entirety of slots 327, 322, respectively, thus allowing the belts 326, 321 to move with respect to one another in the direction of movement arrow 1001.

Figure 12:
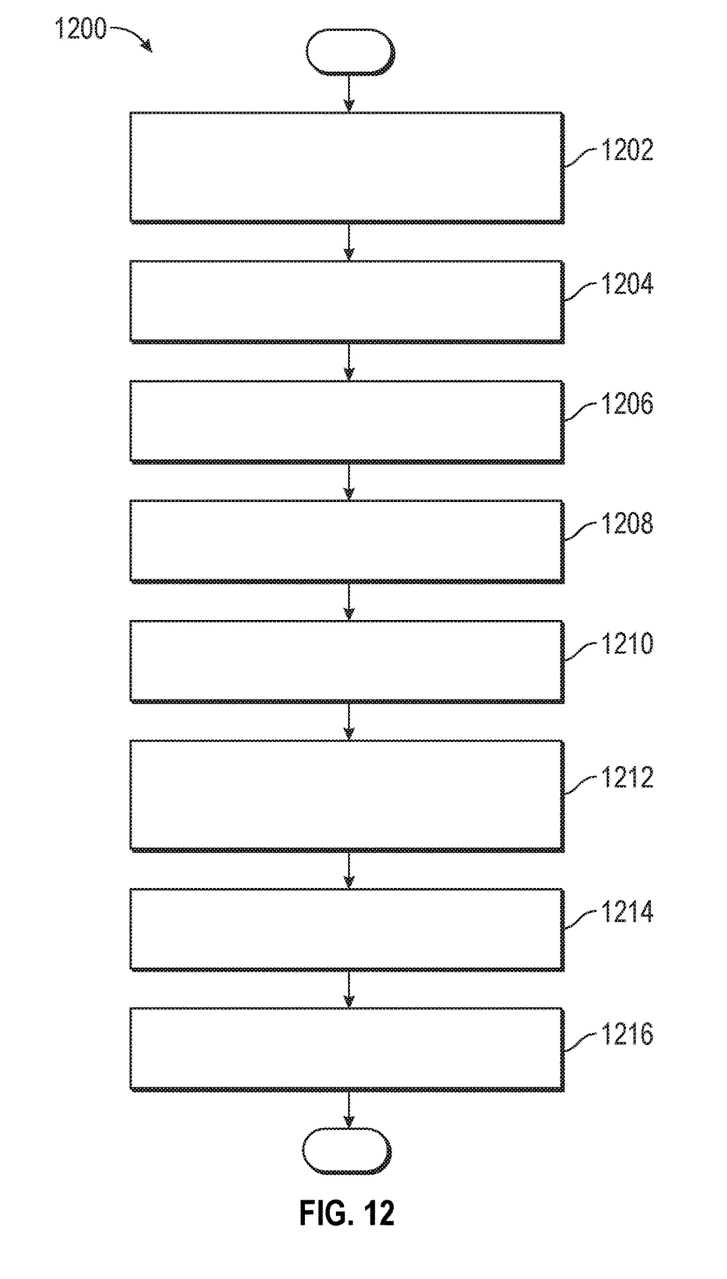
FIG. 12 is a flowchart illustrating a method for single-handed operation of a flexible pouch in accordance with an embodiment of the present disclosure.

FIG. 12 is a flowchart illustrating a method 1200 that a user may use to operate the flexible pouch described above, particularly with regard to FIGS. 10 and 11. That is, in practice, the operator will use the flexible pouch in the following manner: Beginning with the pouch body 310 and belt assembly 320 in the fully retracted (contracted) position and the spring-loaded pin mechanism 330 in the locked position (step 1202), the operator may use one hand to grasp the mechanism 330 and apply a force thereto, causing the mechanism 330 to move from the locked to the unlocked position (step 1204), as described above. Once the mechanism 330 is unlocked, the user may, again using a single hand, grasp the belt assembly 320 and pull outward, which causes the belts 321, 326 to move relative to one another, increasing the total length occupied by both belts, and creating an opening to the interior of the flexible pouch (step 1206). At this point, the operator, again using a single hand, may return the spring-loaded pin mechanism 330 to the locked position, preventing any return movement of the belts due to the flexible nature of the pouch body 310 (step 1208). Thus, the flexible pouch is now locked in the open position. Thereafter, the user may place an object in the flexible pouch, or retrieve an object from the flexible pouch, again using a single hand (step 1210). Once the object has been placed or retrieved, the operator may again unlock the spring-loading pin mechanism 330 by applying force with only one hand (step 1212), allow the belts to return to the original (fully contracted/retracted position) (step 1214), and re-lock the mechanism 330, again with only one hand (step 1216). It should also be noted that the elastic bands 324, guided through the band guides 328, provide at least part of the return force and guiding the allow the flexible pouch to always return to the same base position when not locked in an expanded position.

Accordingly, the present disclosure has provided embodiments of a single-hand operated flexible storage compartment, for use at various possible locations throughout a vehicle, which stays in an open position during object loading/unloading. The flexible pouch expands (i.e., opens) and contracts (i.e., closes) due to flexibility built into the pouch body and associated belt assembly. The pouch stays in the open position due to a spring-loaded pin mechanism and slot design included as part of the belt assembly. Thus, it becomes possible to move objects to/from the flexible pouch using just a single hand.

While at least one exemplary flexible pouch assembly has been presented in the foregoing detailed description, it should be appreciated that a vast number of variations exist. It should also be appreciated that the exemplary flexible pouch assembly or exemplary flexible pouch assemblies are only examples, and are not intended to limit the scope, applicability, or configuration of the disclosure in any way. Rather, the foregoing detailed description will provide those skilled in the art with a convenient road map for implementing an exemplary flexible pouch assembly of the disclosure. It is understood that various changes may be made in the function and arrangement of elements described in an exemplary flexible pouch assembly without departing from the scope of the disclosure as set forth in the appended claims.

What is claimed is:

1. A single-hand operable flexible pouch assembly comprising:
   a substrate;
   a flexible pouch body attached to the substrate along only part of a perimeter of the flexible pouch body, leaving at least a portion of the perimeter of the flexible pouch body unattached to the substrate; and
   a belt assembly connected to the perimeter of the flexible pouch body along said portion thereof that is unattached to the substrate, wherein the belt assembly comprises:
      a first, inner belt comprising a first slot, the first slot comprising a plurality of first pin-hole portions having a first diameter and a plurality of first straight portions between the first pin-hole portions having a first width, wherein the first diameter has a greater magnitude than the first width;
      a second, outer belt comprising a second slot, the second slot comprising a plurality of second pin-hole portions having a second diameter and a plurality of second straight portions between the second pin-hole portions having a second width, wherein the second width is of substantially the same magnitude as the first diameter and wherein the second diameter has a greater magnitude than the second width; and
      a spring-loaded pin mechanism comprising a pin and a spring, wherein the pin is configured in four portions, including: (1) a first, innermost portion having a diameter that is of substantially the same magnitude as the first width, (2) a second portion, immediately outward from the innermost portion, having a diameter that is of substantially the same magnitude as both the first diameter and the second width, (3) a third portion, immediate outward from the second portion, having a diameter that is of substantially the same magnitude as the second diameter, and (4) a fourth, outermost portion having a diameter greater than the second diameter, and wherein the spring is disposed over the first, innermost portion of the pin.

2. The pouch assembly of claim 1, wherein the pouch body is attached to the substrate with stitching.

3. The pouch assembly of claim 1, wherein the belt assembly further comprises a flexible belt cover surrounding and enclosing the first and second belts, wherein the belt cover comprises a hole to allow the spring-loaded pin mechanism to pass at least partially therethrough.

4. The pouch assembly of claim 1, wherein each of the first and second belt comprise an attachment end that are respectively receivable into first and second hinge portions along the substrate.

5. The pouch assembly of claim 1, wherein the flexible pouch body is made from a flexible material and wherein the pouch body comprises a flange portion around said portion of the perimeter thereof that is attached to the substrate.

6. The pouch assembly of claim 1, wherein the spring-loaded pin assembly further comprises a nut cap and a washer coupled with the first, innermost portion, wherein the spring is disposed in between the nut cap and the washer.

7. The pouch assembly of claim 1, wherein each belt comprises an elastic band that passes through and is secured by the substrate.

8. The pouch assembly of claim 7, wherein each belt comprises a band guide detent, wherein the elastic band of the first belt passes through the band guide detent of the second belt, and wherein the elastic band guide of the second belt passes through the band guide detent of the first belt.

9. A vehicle comprising:
   a vehicle body;
   a substrate coupled to the vehicle body; and
   a flexible pouch body attached to the substrate along only part of a perimeter of the flexible pouch body, leaving at least a portion of the perimeter of the flexible pouch body unattached to the substrate; and
   a belt assembly connected to the perimeter of the flexible pouch body along said portion thereof that is unattached to the substrate, wherein the belt assembly comprises:
      a first, inner belt comprising a first slot, the first slot comprising a plurality of first pin-hole portions having a first diameter and a plurality of first straight portions between the first pin-hole portions having a first width, wherein the first diameter has a greater magnitude than the first width;
      a second, outer belt comprising a second slot, the second slot comprising a plurality of second pin-hole portions having a second diameter and a plurality of second straight portions between the second pin-hole portions having a second width, wherein the second width is of substantially the same magnitude as the first diameter and wherein the second diameter has a greater magnitude than the second width; and a spring-loaded pin mechanism comprising a pin and a spring, wherein the pin is configured in four portions, including: (1) a first, innermost portion having a diameter that is of substantially the same magnitude as the first width, (2) a second portion, immediately outward from the innermost portion, having a diameter that is of substantially the same magnitude as both the first diameter and the second width, (3) a third portion, immediate outward from the second portion, having a diameter that is of substantially the same magnitude as the second diameter, and (4) a fourth, outermost portion having a diameter greater than the second diameter, and wherein the spring is disposed over the first, innermost portion of the pin.

10. The vehicle of claim 9, wherein the substrate comprises a door trim panel of the vehicle, a central console side wall of the vehicle, a seat-back of the vehicle, a cargo wall or floor of the vehicle, or a roof surface of the vehicle.

11. The vehicle of claim 9, wherein the pouch body is attached to the substrate with stitching.

12. The vehicle of claim 9, wherein the belt assembly further comprises a flexible belt cover surrounding and enclosing the first and second belts, wherein the belt cover comprises a hole to allow the spring-loaded pin mechanism to pass at least partially therethrough.

13. The vehicle of claim 9, wherein each of the first and second belt comprise an attachment end that are respectively receivable into first and second hinge portions along the substrate.

14. The vehicle of claim 9, wherein the flexible pouch body is made from a flexible material and wherein the pouch body comprises a flange portion around said portion of the perimeter thereof that is attached to the substrate.

15. The vehicle of claim 9, wherein the spring-loaded pin assembly further comprises a nut cap and a washer coupled with the first, innermost portion, wherein the spring is disposed in between the nut cap and the washer.

16. The vehicle of claim 9, wherein each belt comprises an elastic band that passes through and is secured by the substrate.

17. The vehicle of claim 16, wherein each belt comprises a band guide detent, wherein the elastic band of the first belt passes through the band guide detent of the second belt, and wherein the elastic band guide of the second belt passes through the band guide detent of the first belt.

18. A method for operating a single-hand operable flexible pouch assembly, wherein the single-hand operable flexible pouch assembly comprises a substrate, a flexible pouch body attached to the substrate along only part of a perimeter of the flexible pouch body, leaving at least a portion of the perimeter of the flexible pouch body unattached to the substrate, and a belt assembly connected to the perimeter of the flexible pouch body along said portion thereof that is unattached to the substrate, wherein the belt assembly comprises:

a first, inner belt comprising a first slot, the first slot comprising a plurality of first pin-hole portions having a first diameter and a plurality of first straight portions between the first pin-hole portions having a first width, wherein the first diameter has a greater magnitude than the first width, a second, outer belt comprising a second slot, the second slot comprising a plurality of second pin-hole portions having a second diameter and a plurality of second straight portions between the second pin-hole portions having a second width, wherein the second width is of substantially the same magnitude as the first diameter and wherein the second diameter has a greater magnitude than the second width, and a spring-loaded pin mechanism comprising a pin and a spring, wherein the pin is configured in four portions, including: (1) a first, innermost portion having a diameter that is of substantially the same magnitude as the first width, (2) a second portion, immediately outward from the innermost portion, having a diameter that is of substantially the same magnitude as both the first diameter and the second width, (3) a third portion, immediate outward from the second portion, having a diameter that is of substantially the same magnitude as the second diameter, and (4) a fourth, outermost portion having a diameter greater than the second diameter, and wherein the spring is disposed over the first, innermost portion of the pin, wherein the method comprises the steps of:

applying a force to the spring-loaded pin mechanism to cause the spring-loaded pin mechanism to move from a locked position to an unlocked position;

pulling the belt assembly outwardly away from the substrate to cause the first, inner belt to move relative to the second, outer belt so as to increase a length of the belt assembly; and releasing the force applied to the spring-loaded pin mechanism to cause the spring-loaded pin mechanism to from the from unlocked position to the locked position.

19. The method of claim 18, further comprising the step of, after releasing the force applied to the spring-loaded pin mechanism, placing an object into the single-hand operable flexible pouch assembly or retrieving an object from the single-hand operable flexible pouch assembly.

20. The method of claim 18, further comprising the step of, after releasing the force applied to the spring-loaded pin mechanism, re-applying the force to the spring-loaded pin mechanism to cause the spring-loaded pin mechanism to move from the locked position to the unlocked position.

* * * * *